Aug. 4, 1931.                P. F. SPERY                1,817,107
                       AUTOMOBILE LUGGAGE TRUNK
                         Filed Nov. 1, 1928
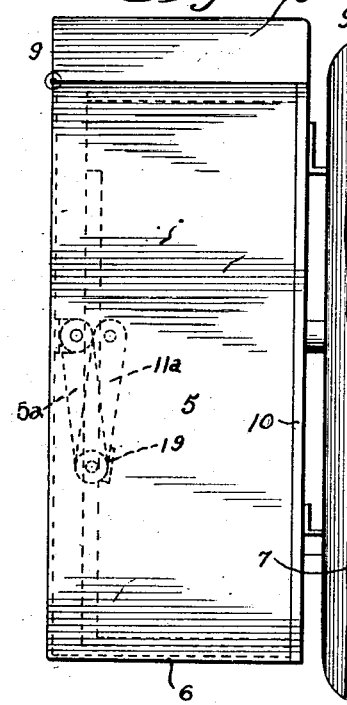
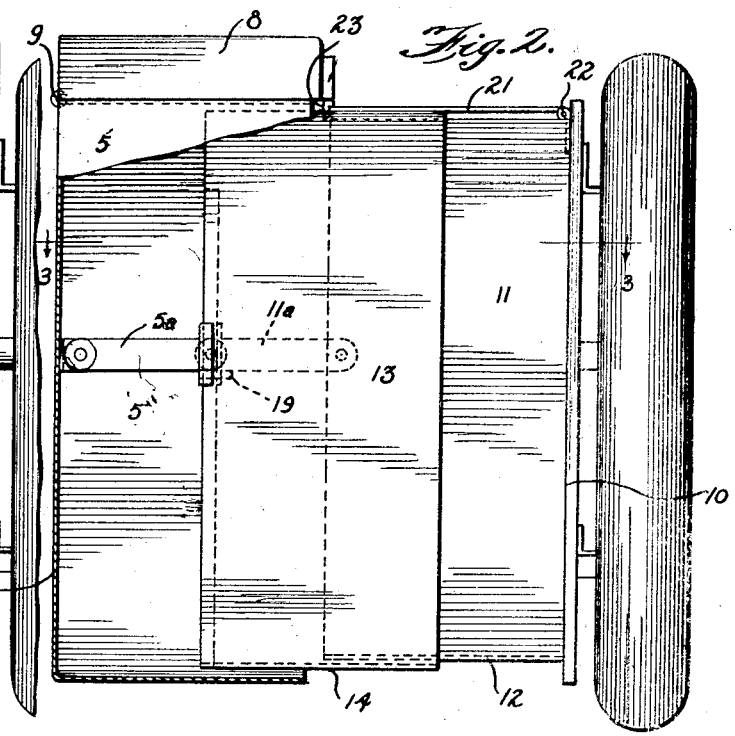
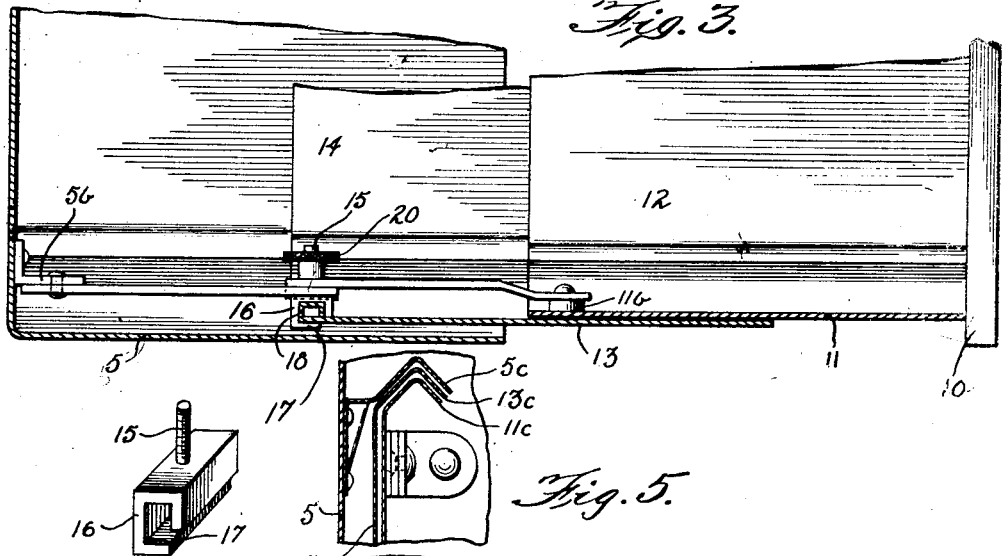
Inventor
Philmore F. Spery
by Bair, Freeman & Sinclair
Attorneys
Witness
Vinton Read Patented Aug. 4, 1931

1,817,107

UNITED STATES PATENT OFFICE

PHILMORE F. SPERY, OF CHICAGO, ILLINOIS, ASSIGNOR, BY MESNE ASSIGNMENTS, TO KARI-KEEN MANUFACTURING COMPANY, OF SIOUX CITY, IOWA

AUTOMOBILE LUGGAGE TRUNK

Application filed November 1, 1928. Serial No. 316,532.

My invention relates to trunks of the type carried at the rear of automobiles and like vehicles, and more particularly to such types of trunks that are extensible to enlarge their capacity at such time as greater contents are to be carried, and my main object is to provide a novel expedient whereby the extension may be well and rigidly supported.

A further object of my invention is to establish a novel relation betwen the sections of the trunk as assembled in telescopic order, so that these sections may cooperate automatically to make a firm and lasting connection at all times.

Another object of the invention is to use a novel folding link expedient to regulate one of the sections of the trunk, so as to best cooperate with the other sections thereof.

A final, but nevertheless important object of the invention is to design the improved connection between the trunk sections on simple lines, so that it may operate with ease and be produced inexpensively.

With the above objects in view and any others that may suggest themselves in the specification and claims to follow, a better understanding of the invention may be gained by reference to the accompanying drawings, in which—

Figure 1 is a side elevation of the trunk in closed condition, showing a fragmentary illustration of a tire carried by the back portion of the trunk;

Fig. 2 is a side view of the trunk as extended, partly broken away;

Fig. 3 is an enlarged plan section of Figure 2, showing the manner of connection of the trunk sections at one side of the trunk;

Fig. 4 is a perspective view of a slide involved in the folding-link mechanism; and Fig. 5 is a fragmentary vertical section of one side and lower corner of the trunk, illustrating alining means for the sections thereof.

Referring specifically to the drawings, 5 denotes the side wall, 6 the bottom, 7 the front wall, and 8 the cover of a typical automobile trunk, the cover being hinged to the front wall 7 as indicated at 9. For my purposes, the assembly just described serves as the main section of the trunk, and is open at the rear to receive a closing plate or back wall 10.

The closing plate 10 forms the rear wall and reinforcer for a U-shaped section 11, having a bottom 12. About this section is disposed a similar section 13 having a bottom 14, and when the rear plate 10 is moved forwardly, it is intended that the sections 11 and 13 telescope into the section 5, the plate 10 then forming a closure for the collapsed trunk, as indicated in Figure 1.

In order to extend the trunk, the section 11 is first drawn out. However, the section 13 is intended to form a support for the section 11, so that the latter may occupy a fully extended position without becoming disengaged from the trunk. It is therefore desirable that the section 13 be extended but partially, as indicated in Figure 2, so that it may itself receive support in the main section 5. I have found it difficult to deal with the intermediate section 13 as quickly as with the section 11. In other words, should the section 13 be made to travel pursuant to the direct pull of the section 11 when the latter is extended, it will be found that friction seriously interferes with the motion of the sections. It must be realized that in order to keep the trunk from rattling or sagging, the sections are fitted fairly close, although the drawing shows them loosely spaced for the sake of clearness. Therefore it will be realized, that friction is first encountered in withdrawing the section 11, and further in the withdrawing of the section 13.

I have provided a novel expedient whereby the section 13 will be caused to travel at a reduced rate. Thus, while the section 11 must be withdrawn fully, and the section 13 but partially or half-way, I engineer the motion of the section 13 at half-rate, whereby the same amount of travel is accomplished but at a slower rate and with consequent less effort.

The sections 5 and 11 are directly joined by a pair of folding links 5a and 11a, these links being secured to lateral elements 5b and 11b of the sections, and being foldable on a medial pivot pin 15. The latter has an external enlargement in the form of a vertical sleeve 16, and this sleeve is open at one side as indicated at 17 to be mounted slidably on a curl 18 formed on the frontal edge of each side wall of the medial trunk section 13. When the trunk is closed, and the links 5a and 11a are folded as indicated in Figure 1, the sleeve 16 is in a low position along the curl 18. However, when the section 11 is drawn out to extend the trunk, opening the links by this action, the sleeve will be raised by the rise of the medial pivot of the links to the position indicated in Figure 2. At the same time, the arc described by the link 5a will have carried the medial section 13 a corresponding distance, that is, half-way out. It is thus seen that I employ the connecting expedient of the links 5a and 11a for the additional function of a lever with an advantageous ratio, whereby less effort is required to extend the outer sections of the trunk.

The folding links are made with a backing stop 19 to prevent their unfolding beyond the extended position. In actual practice I will design the assembly with the center pivot of the links 19 lower than the end pivots when the trunk is in the position shown in Figure 2, thus avoiding difficulty in refolding, through the involvement of a dead center. Also, I choose to lend the sleeves 16 and the curls 18 a square or other angular cross section to preclude twisting tendencies between the sleeves and the medial sections. Further, I also thread the pin 15, as clearly shown, and provide the same with a thumb nut 20 for the control of the link angle to any desired adjustment. Thus, the trunk may only be desired to extend partially, and with this movement determined, I can readily tighten the thumb nuts 20 to fix the adjustment.

When the trunk is fully extended, it may be of advantage to cover the rear portion thereof, and I have therefore provided an auxiliary lid 21, hinged at 22 to the rear plate 10. Ordinarily, this lid is folded inside the rear section 11, but when the trunk has been extended, it may be caught in a latch 23 carried by the regular lid 8 so as to remain in horizontal position and protect the contents of the extended portion of the trunk from ready access by unauthorized persons and from falling objects or rain.

Consistent with the foregoing mention that the trunk sections are closely assembled for relative sliding action, I deem it advisable to incorporate in the present structure a guiding expedient shown in patent applications on similar trunks now pending in my name. Thus, Figure 5 shows that I have formed the trunk sections with interfitting moldings 5c, 13c, and 11c at the top and with pressed interfitting ridges 5d, 13d, and 11d at the bottom, on each side, to provide self-guiding supports of a firm nature but limited area, so that the sliding surfaces of the sections are not great and conducive to friction.

The sliding occasions friction only in the interfitting elements, and as stated along a limited or narrow area, and therefore reduces friction considerably. The angular nature of these elements also serves to properly aline the trunk sections against twisting or sagging tendencies as occasioned by the vibration of the vehicle carrying the trunk.

I claim as my invention:

1. A trunk comprising a main section, a medial section and a terminal section all telescopically arranged, a pair of links pivotally connected and pivoted at their extreme ends respectively to the main section and the terminal section, a sleeve fixed at the pivot of said links to each other, and a vertical enlargement on the medial section with which said sleeve slidably engages, whereby said medial section is caused to move with but at a slower rate than the terminal section.

2. A trunk comprising a main section, an intermediate section and an end section telescopically arranged, toggle links pivoted at their extreme ends to the main and end sections, said intermediate section being formed with a vertical roll, and a sleeve fixed to the center pivot of said toggle links, said sleeve slidably embracing said roll, whereby movement of the end section of the trunk will result in a slower movement of the intermediate section.

3. A trunk comprising a main section, an intermediate section and an end section telescopically arranged, toggle links pivoted at their extreme ends to the main and end sections, said intermediate section being formed with a vertical roll, and a sleeve fixed to the center pivot of said toggle links, said sleeve slidably embracing said roll, whereby movement of the end section of the trunk will result in a slower movement of the intermediate section, said roll and sleeve being angular in cross section to prevent relative torsional movement thereof.

4. A trunk comprising a main section, an intermediate section and an end section telescopically arranged, toggle links pivoted at their extreme ends to the main and end sections, said intermediate section being formed with a vertical roll, and a sleeve fixed to the center pivot of said toggle links, said sleeve slidably embracing said roll, whereby movement of the end section of the trunk will result in a slower movement of the intermediate section and a locking nut threadedly engaging said center pivot for locking the sections in adjusted position.

5. A trunk comprising a main section, an intermediate section and an end section telescopically arranged, toggle links pivoted at their extreme ends to the main and end sections, said intermediate section being formed with a vertical roll, a sleeve fixed to the center pivot of said toggle links, said sleeve slidably embracing said roll, whereby movement of the end section of the trunk will result in a slower movement of the intermediate section, and a stop means for limiting movement of said toggle links to extended position.

6. An extensible auto trunk comprising a main section with one end open, an extensible section telescopically arranged in the main section and having a rear wall adapted to close the open end thereof, a cover for the main section, and a cover member for the extensible section hinged to its rear wall and foldable within said section when the trunk is collapsed, and a latch carried by the free margin of the main cover for engaging and supporting the cover member over the extensible section.

In testimony whereof I affix my signature.

PHILMORE F. SPERY.